United States Patent
Jones et al.

(10) Patent No.: US 10,077,114 B2
(45) Date of Patent: Sep. 18, 2018

(54) AERIAL DELIVERY PLATFORMS

(71) Applicant: Airborne Systems Limited, Mid Glamorgan (GB)

(72) Inventors: Martyn Philip Jones, Mid Glamorgan (GB); Alex David Wyn Howell, Carmarthen (GB); James Alexander Greig, Dunecht (GB)

(73) Assignee: IRVINGQ LIMITED, Mid Glamorgan (GB)

( * ) Notice: Subject to any disclaimer, the term of this patent is extended or adjusted under 35 U.S.C. 154(b) by 80 days.

(21) Appl. No.: 14/850,159

(22) Filed: Sep. 10, 2015

(65) Prior Publication Data

US 2016/0075437 A1   Mar. 17, 2016

(30) Foreign Application Priority Data

Sep. 17, 2014   (GB) .................................. 1416424.8

(51) Int. Cl.
  *B64D 17/22* (2006.01)
  *B64D 1/14* (2006.01)
  *B64D 9/00* (2006.01)

(52) U.S. Cl.
  CPC .............. *B64D 17/22* (2013.01); *B64D 1/14* (2013.01); *B64D 9/00* (2013.01)

(58) Field of Classification Search
  CPC ... B64D 9/00; B64D 8/12; B64D 1/14; B64D 17/22
  See application file for complete search history.

(56) References Cited

U.S. PATENT DOCUMENTS

| | | | | |
|---|---|---|---|---|
| 7,631,848 B2* | 12/2009 | Enochs | ................ | B66F 7/0666 248/277.1 |
| 8,066,224 B2* | 11/2011 | Schafer | .................... | B64D 1/14 244/137.4 |
| 8,979,031 B2* | 3/2015 | Fox, Jr. | .................... | B64D 1/08 244/137.3 |
| 2001/0050035 A1* | 12/2001 | Mahnken | ................ | B64D 1/14 108/57.12 |
| 2004/0108416 A1* | 6/2004 | Parkinson | ................ | B64F 1/32 244/137.4 |
| 2005/0230555 A1* | 10/2005 | Strong | ................ | B64D 17/343 244/152 |

(Continued)

FOREIGN PATENT DOCUMENTS

| | | |
|---|---|---|
| GB | 2395189 | 5/2004 |
| JP | 2001130496 | 5/2001 |

(Continued)

*Primary Examiner* — Justin M Benedik
(74) *Attorney, Agent, or Firm* — Jacobson Holman, PLLC.

(57) ABSTRACT

An aerial delivery platform comprises first and second modules (10a, 10b) each having a respective load-bearing surface (14). The modules (10a, 10b) are hinged together for relative flexing movement about an axis (24) between the modules (10a, 10b). A superstructure of interconnected struts (25, 26, 27, 28, 29) is connected to, and is upstanding from, the modules (10a, 10b) to hold the modules (10a, 10b) with the load bearing surfaces (14) co-planar when loaded and during descent but being elastically deformable to permit limited relative flexing movement between the modules (10a, 10b) under the loads applied by parachute opening and on landing to assist in the absorption the energy transferred to the platform.

22 Claims, 9 Drawing Sheets

(56) References Cited

U.S. PATENT DOCUMENTS

| | | | | |
|---|---|---|---|---|
| 2007/0063103 A1* | 3/2007 | Fox, Jr. | ................. | B64D 17/62 |
| | | | | 244/152 |
| 2009/0302164 A1* | 12/2009 | Fox, Jr. | ................... | B64D 1/08 |
| | | | | 244/137.3 |
| 2010/0108817 A1* | 5/2010 | Fox, Jr. | ............... | B64D 17/383 |
| | | | | 244/142 |
| 2011/0240800 A1* | 10/2011 | Fox, Jr. | ................... | B64D 1/14 |
| | | | | 244/138 R |

FOREIGN PATENT DOCUMENTS

| WO | WO 92/18801 | 10/1992 | | |
|---|---|---|---|---|
| WO | WO 9218801 A1 * | 10/1992 | ............ | B60R 19/26 |
| WO | WO 2008/125815 | 10/2008 | | |

* cited by examiner

AERIAL DELIVERY PLATFORMS

The invention relates to aerial delivery platforms.

An aerial delivery platform comprises a load bearing surface for carrying a cargo before being loaded onto an aircraft, transported by air and then dropped from the aircraft under parachute. Such a platform is subject to significant loads; in particular the load from the parachute on opening and the load as the platform hits the ground.

In order to resist such loads, it is known to make the platform sufficiently strong to resist these forces. This has the disadvantage, however, that the consequent platform is heavy, expensive to produce and difficult to manoeuvre.

According to the invention, there is provided an aerial delivery platform comprising first and second modules each having a respective load-bearing surface, the first and second modules being connected together for relative flexing movement about an axis between the modules, and structural members connected to, and upstanding from, the first and second modules to hold the modules with the load bearing surfaces co-planar when loaded and during descent but deformable elastically to permit limited relative flexing movement between the first and second modules on parachute opening and on landing.

The limited movement between the hinged modules permitted by the elastic deformation of the structural members allows the platform to absorb the energy transferred to the platform on parachute opening and landing and allows the platform to be lighter and so more easily manoeuvred.

Further modules and associated structural members can be added to extend the length of the platform.

Figure 1:
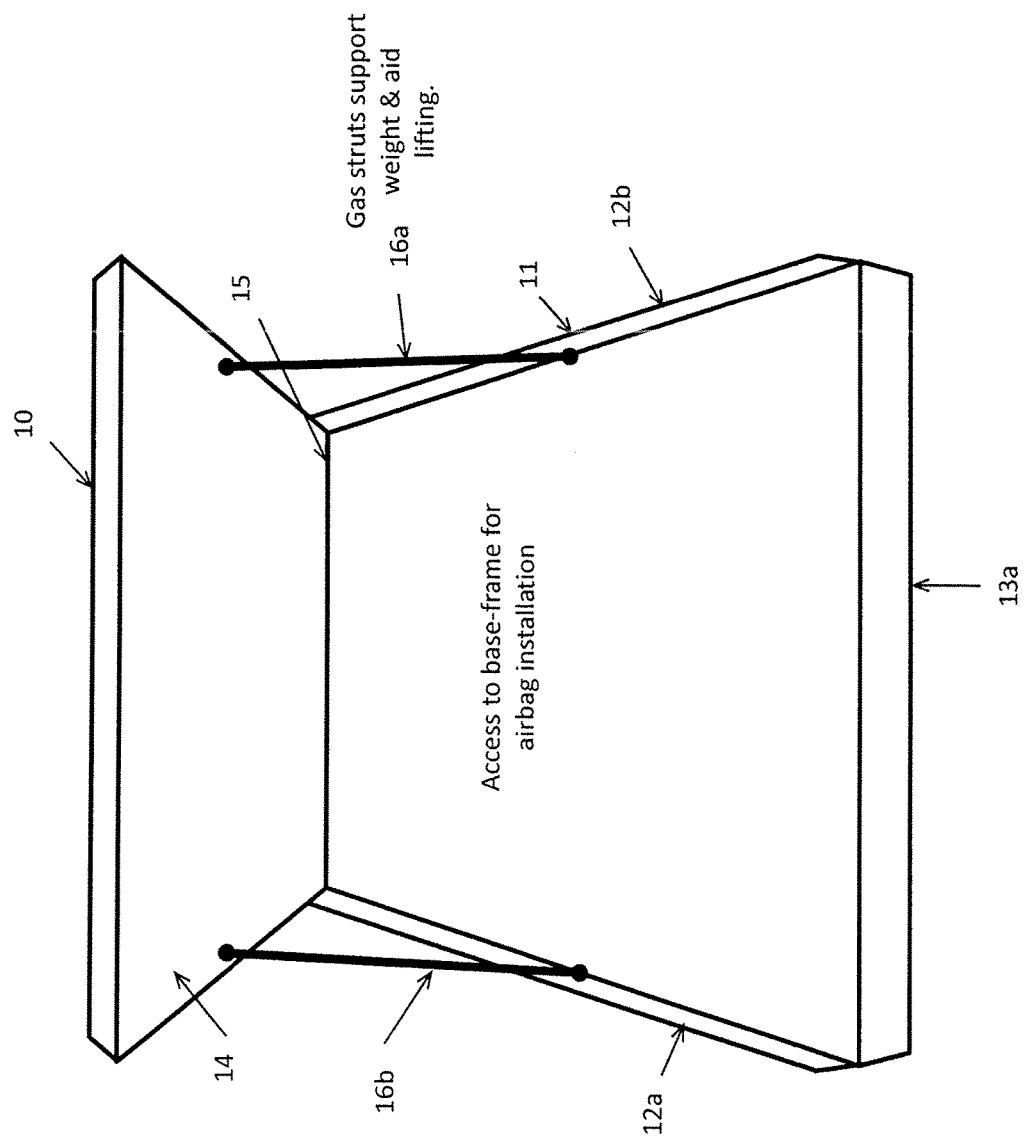
Figure 2:
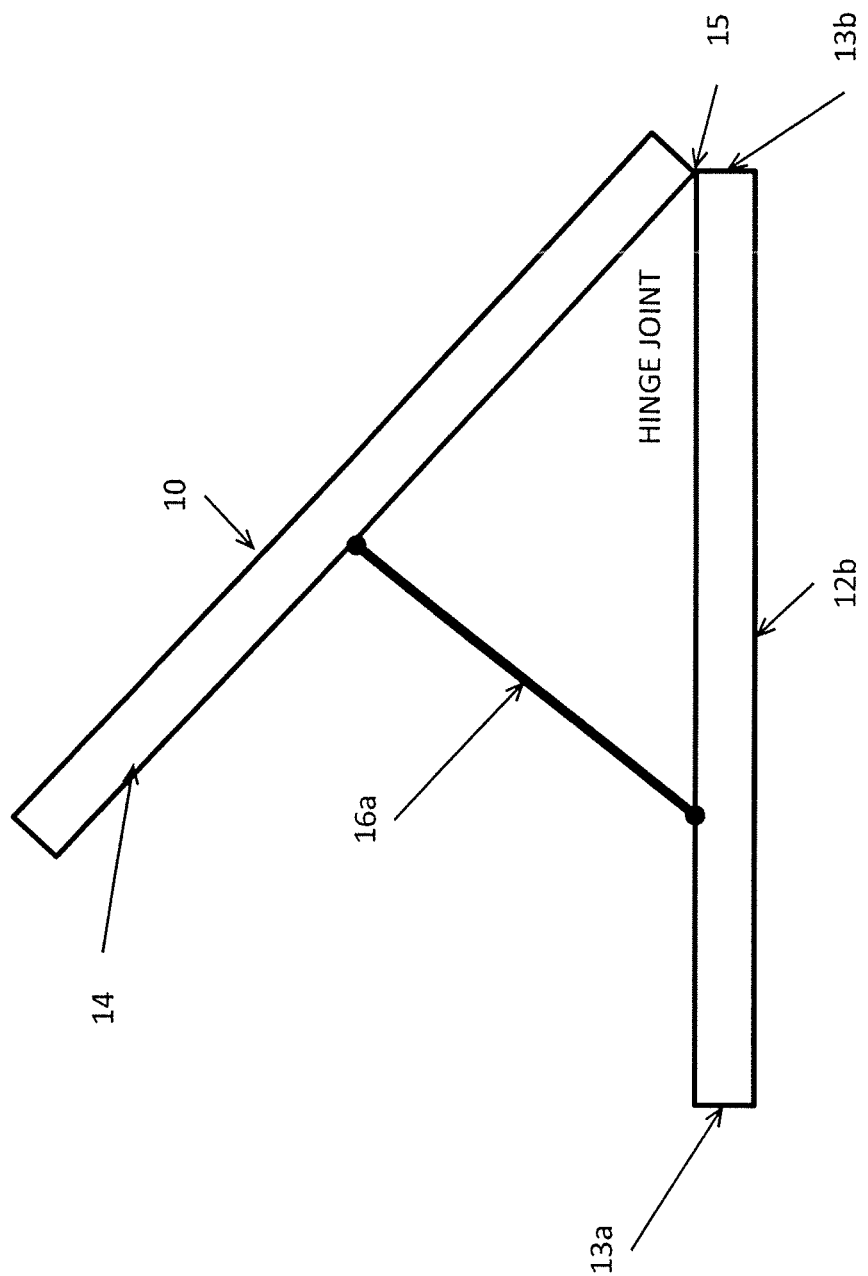
Figure 3:
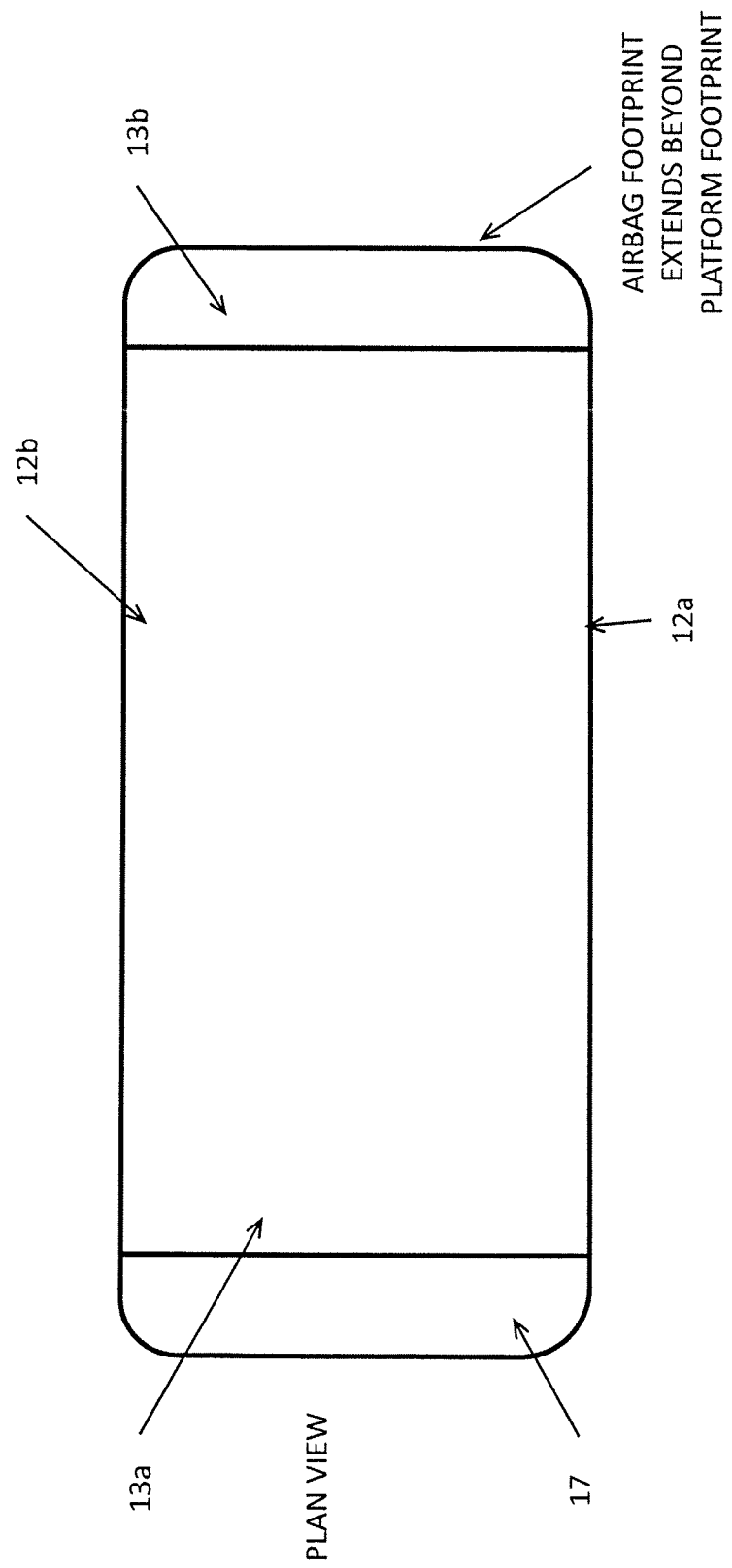
Figure 4:
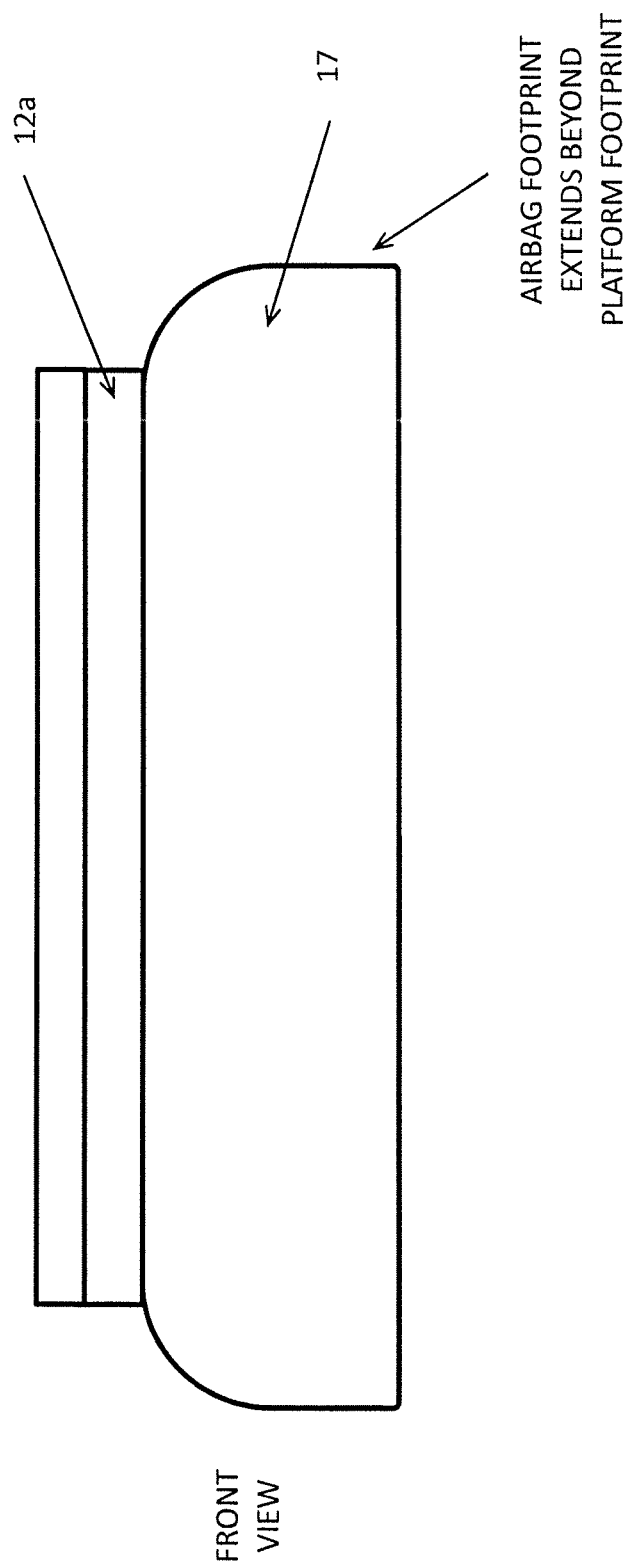
Figure 5:
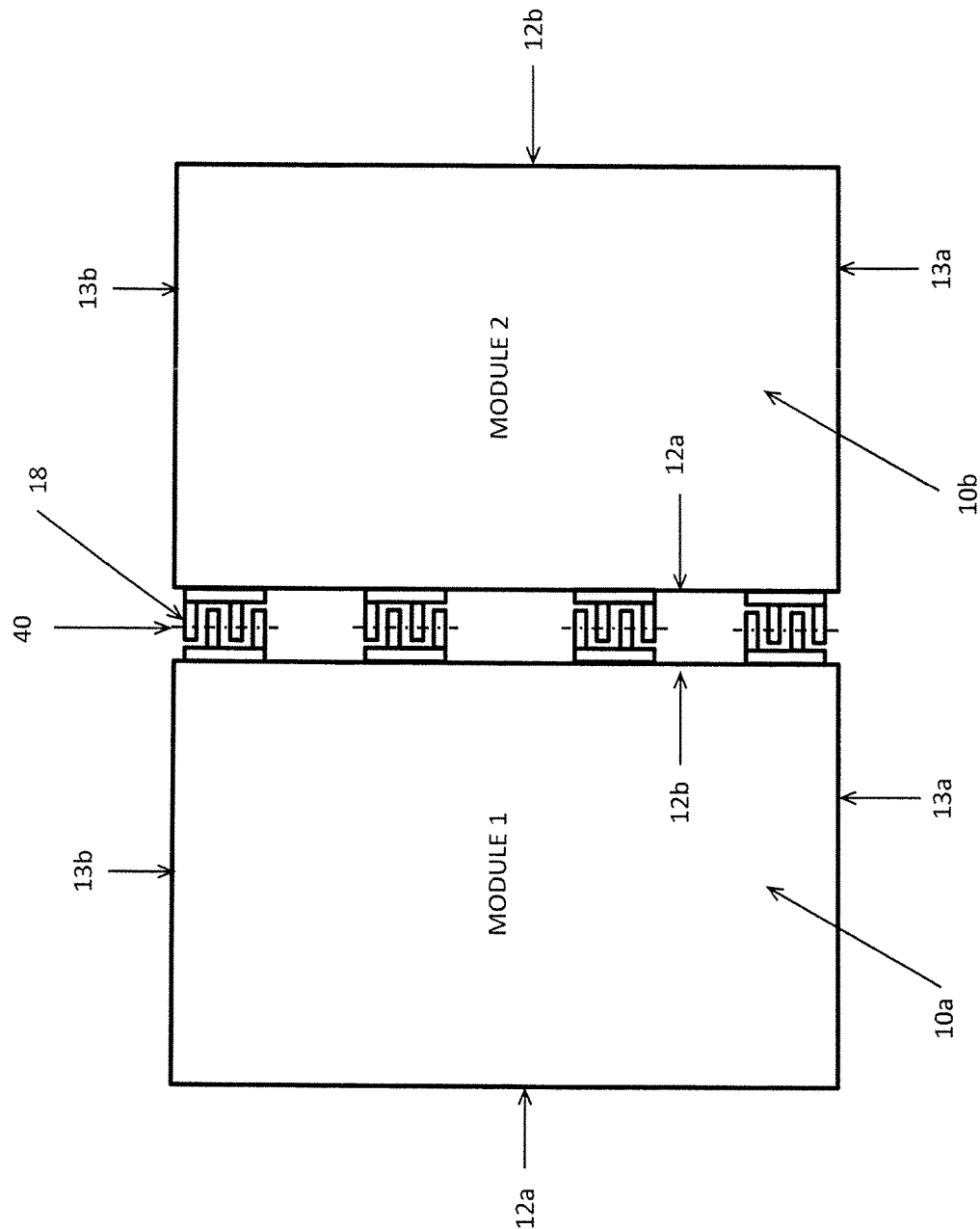
Figure 6:
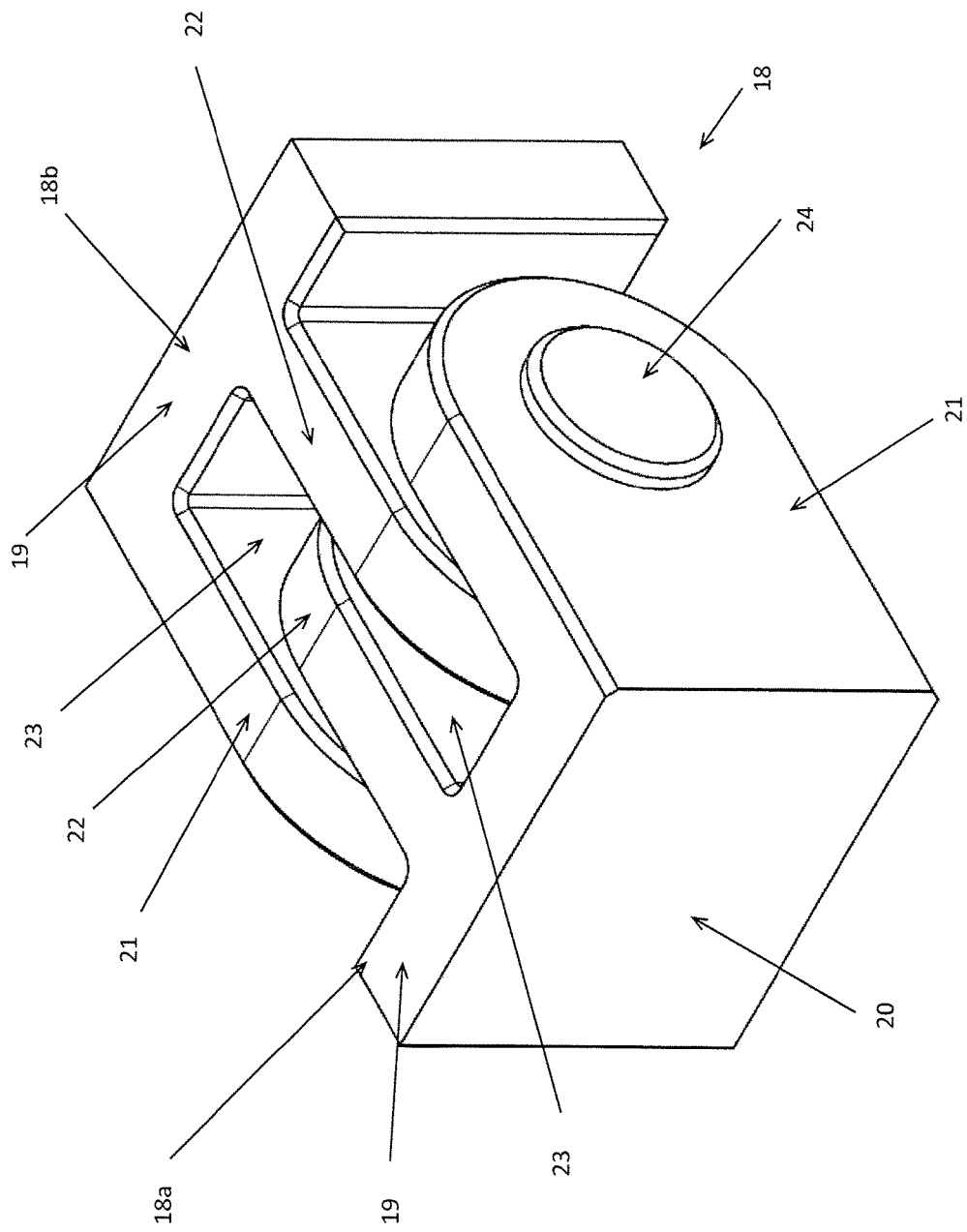
Figure 7:
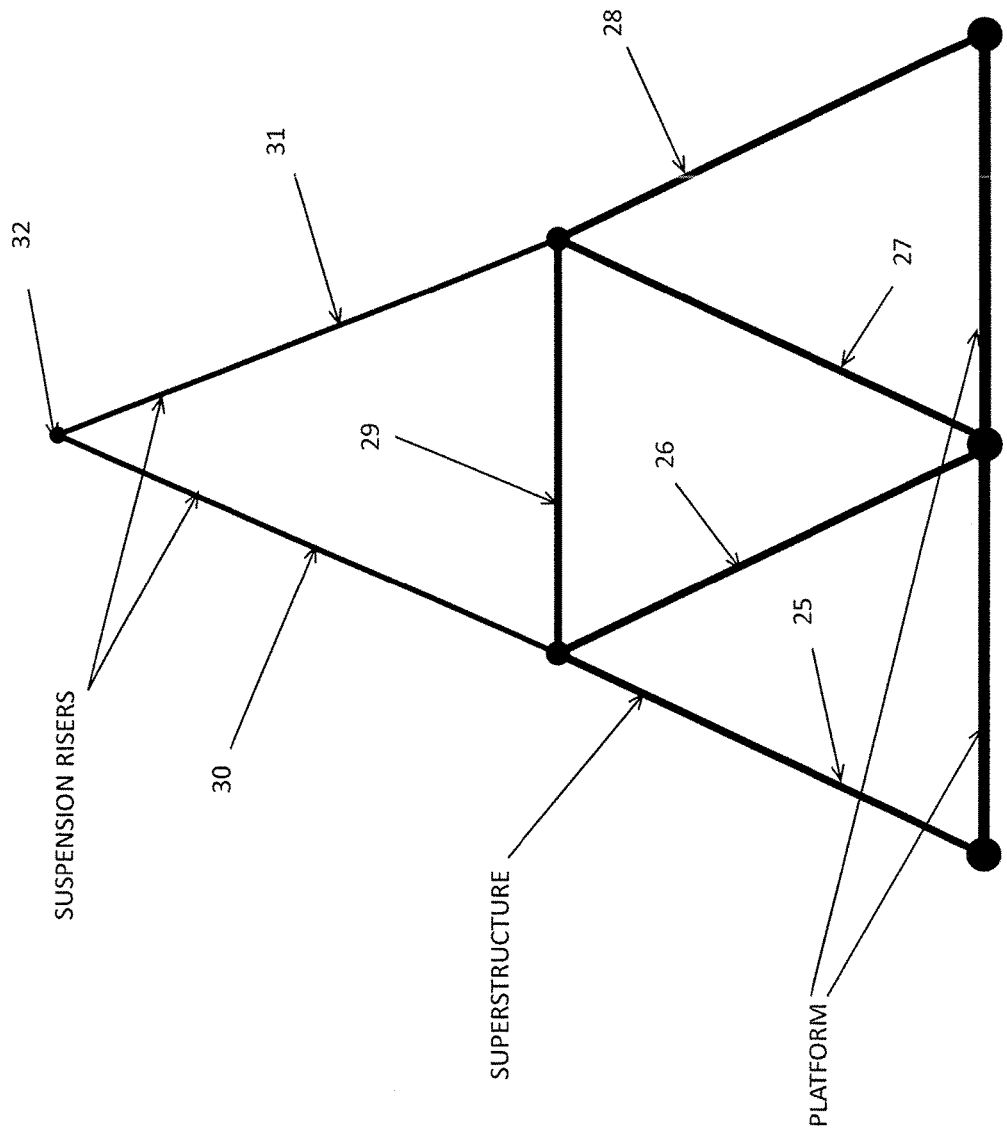
Figure 8:
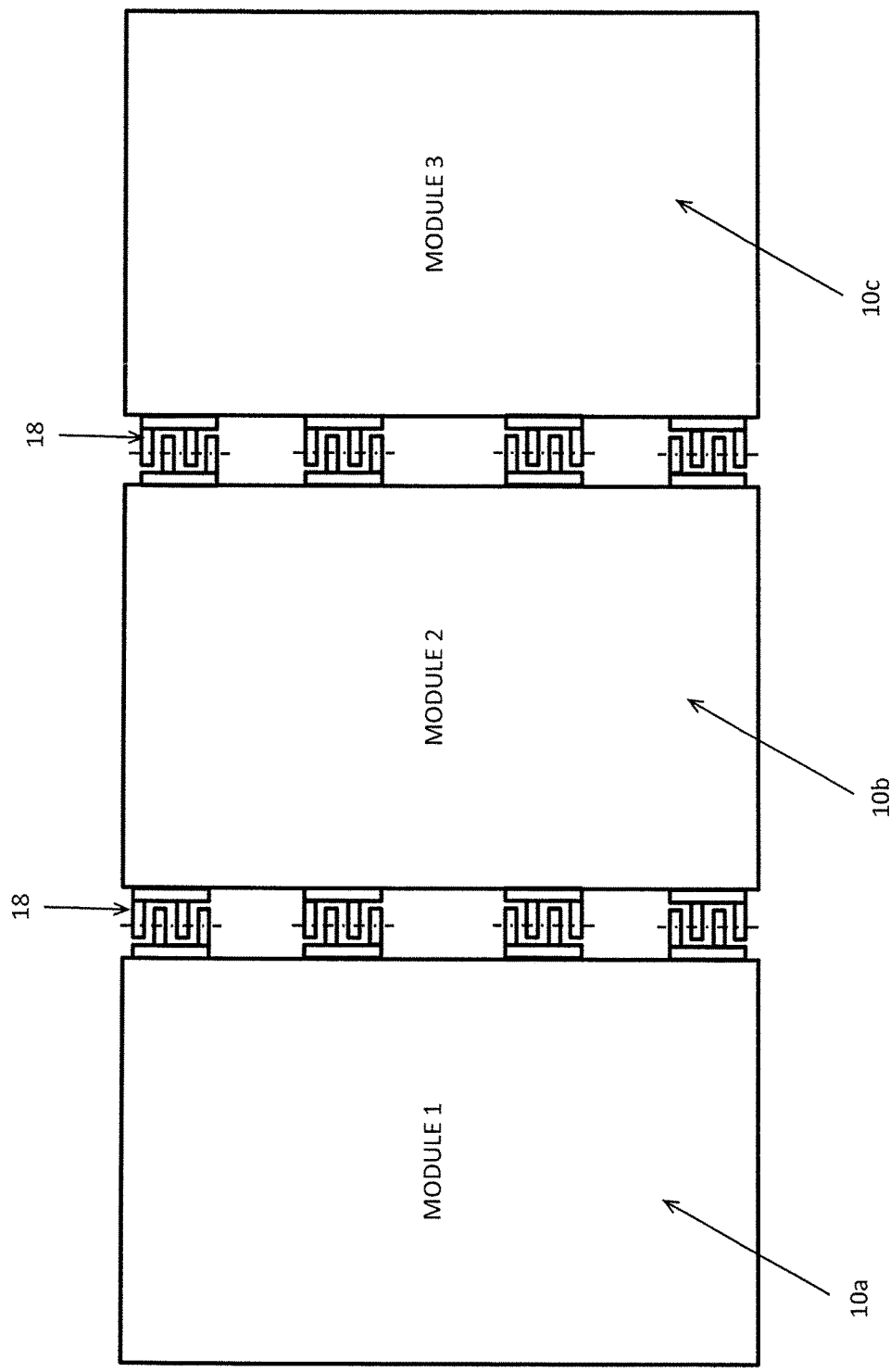
Figure 9:
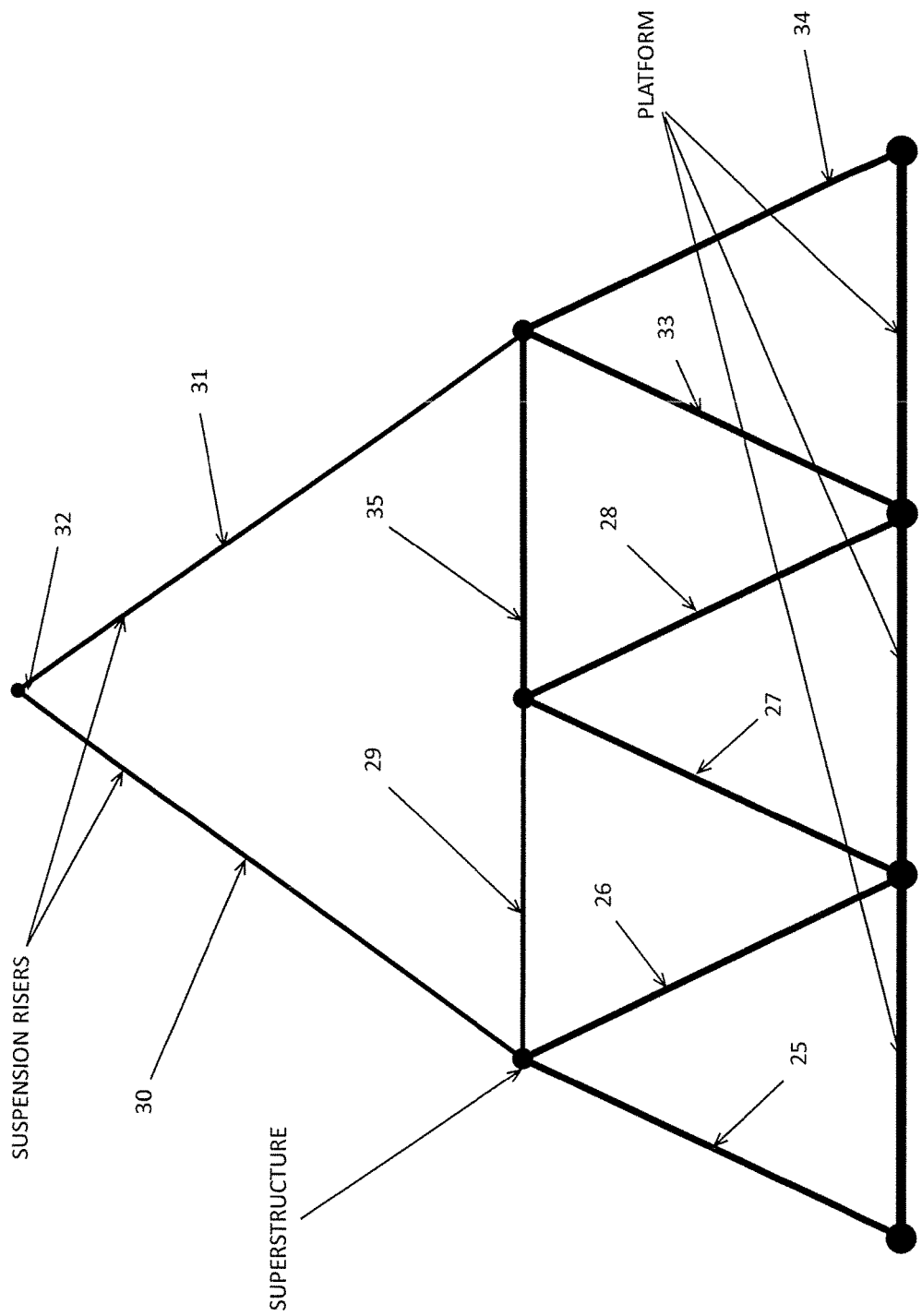

The following is a more detailed description of some embodiments of the invention, by way of example, reference being made to the accompanying drawings, in which:

FIG. 1 is a schematic view of a platform module for forming an aerial platform showing a lid of the module opened out of a frame of the module, FIG. 2 is a schematic side elevation of the module of FIG. 1, FIG. 3 is a schematic plan view from above of the module of FIGS. 1 and 2 with an airbag of the module inflated, FIG. 4 is a side elevation of the module of FIG. 3 with the airbag inflated, FIG. 5 is a schematic plan view of two of the modules shown in FIGS. 1 to 4 hinged together to form a platform, FIG. 6 is a perspective view of a hinge for interconnecting the two modules of FIG. 5, FIG. 7 is a side elevation of the platform of FIG. 6 showing a truss structure and a suspension riser of the platform, FIG. 8 is a similar view to FIG. 5 but showing a platform formed from three modules hinged together to from a platform, and FIG. 9 is a side elevation of the platform of FIG. 8 showing a truss structure and a suspension riser of the platform Referring first to FIGS. 1 and 2, the platform module 10 comprises a rectangular frame 11 with longer transverse members 12a, 12b interconnected by shorter side members 13a, 13b. These members may be of a metal such as aluminium or steel. A rectangular lid 14 is hinged to a side member 13a of the frame 11 along an edge 15 of the lid 14.

The lid 14 may be formed from composite materials and two gas struts 16a, 16b extend between the lid 14 and the transverse members 12a, 12b of the frame 11. The lid 14 can thus be closed into the frame 11 or opened out of the frame 11 with the struts 16a, 16b aiding opening movement and supporting the opened lid 14. When the lid 14 is closed into the frame 11, the lid forms a load-bearing surface and may include attachment points to allow the attachment of a load to the module.

The purpose of providing the hinged lid 14 is to allow access through the frame 11 to a base frame (not shown) formed of members placed longitudinally and laterally allowing space for mounting an airbag 17 (see FIGS. 3 and 4). The airbag 17 is of conventional type formed by panels of high-strength textile material joined together to form an enclosed bag with holes for inflation and venting. As seen in FIGS. 3 and 4, the airbag, when deployed, extends laterally beyond the side edges 12a, 12b of the frame 11. The lid 14 can also be used for maintenance access.

A platform is formed from two modules 10a, 10b of the kind described above with reference to FIGS. 1 to 4. Referring next to FIG. 5, the modules 10a, 10b are hinged together along adjacent transverse members 12a, 12b via four hinges 18. Referring additionally to FIG. 6, each hinge 18 is formed from two identical hinge parts 18a, 18b. Each part 18a, 18b comprises a rectangular base 19 having a rear surface 20 by which it is mounted on the associated transverse member 12a, 12b and a front surface from which extends two parallel mounting plates 21, 22 forming a slot 23 between them. A plate 22 of one hinge part 18a, 18b extends into the slot 23 of the other hinge part 18a, 18b and a pivot pin 24 extends through the four plates 21, 22 to allow relative pivoting movement between the hinge parts 18a, 18b about the axis of the pivot pin 24. The axes 40 of all four pivot pins 24 of the four hinges 18 are co-axial.

The two modules 10a, 10b carry a superstructure of structural members seen in FIG. 7. The structural members are formed, in this embodiment of the invention, as two truss structures, each extending along a respective side of the hinged modules 10a, 10b and one of which truss structures, is seen in FIG. 7. The truss comprises five struts 25-29. Two struts 25, 26 extend upwardly and inwardly from respective ends of the side edges 13a, 13b of one module 10a to meet at an apex and two struts 27, 28 extend upwardly and inwardly from respective ends 13a, 13b of the other module 10b to meet at an apex. The apex of the struts 25, 26 is connected to the apex of the struts 27, 28 by a horizontal strut 29.

In this way, the sides of the hinged modules 10a, 10b carry respective trusses that inhibit the modules 10a, 10b from relative pivoting movement about the hinges 18. The struts 25, 26, 27, 28, 29 are, however, capable of elastic deformation under certain applied loads. The effect of this will be described below.

Each truss carries a pair of suspension risers 30, 31 that extend upwardly from respective apices of the struts 25, 26 and 27, 28 to meet at a mounting point 32. The purpose of this will be described below.

The platform described above is for use in transporting a load by air and dropping the load by parachute to a landing site. The modules 10a, 10b are stored separately from each other and from the airbags 17 and the trusses. When a platform is required, two modules 10a, 10b are taken from storage. For each module 10a, 10b, the lid 14 is opened to access the base frame and an airbag 17 attached to the base frame. The lid 14 is then closed and the two modules 10a and 10b hinged together by inserting respective pins 24 through the mating hinge parts 18a, 18b of the four hinges 18. Two sets of struts 25-29 are then assembled on the connected modules 10a, 10b to form trusses along both edges of the modules 10a, 10b as described above. Finally, the risers 30, 31 are added. The platform is then ready for use.

A cargo is located on the platform resting on the lids 14 and between the trusses. The lids 14 and the side members 13a, 13b may be provided with fixing points for holding the load to the platform. A packed parachute or parachutes of known type are attached to the mounting point 32. The load carrying platform is then loaded onto an aircraft in known fashion and located in the aircraft. At the despatch location, the platform with the cargo is ejected from the aircraft. The parachute or parachutes open after a predetermined descent. As the parachutes open, the sudden deceleration applies a significant load to the platform via the trusses. The trusses deform elastically under this load so allowing limited relative pivoting movement between the modules 10a, 10b through the hinges 18 and this allows the platform to absorb the energy from this load without permanent deformation of the platform. When this load is removed, the trusses regain their undeformed state and the modules 10a, 10b pivot back around the hinges 18 to a co-planar configuration.

Prior to landing, the airbags 17 beneath the modules 10a, 10b are deployed by a system activated by deployment of the parachute or parachutes. The airbags 17 fill with air through the apertures. The airbags 17 thus cushion the landing of the modules 10a, 10b as air escapes through the apertures. Nevertheless, on landing there is a similar large applied load to the platform as it decelerates. This may not be an evenly applied load. Some of the energy of the landing is absorbed by the airbags 17 and the portions of the airbags 17 that extend beyond the sides of the modules 10a, 10b provide stability and manage energy dissipation on ground impact. In addition, however, the trusses will also deform elastically under these loads and so permit a small degree of relative pivotal movement between the modules 10a, 10b about the hinges 18, as described above. The ability of the modules 10a, 10b to pivot relative to one another under such loads allows the platform to absorb these loads without damage and allows the modules to be much lighter in weight, and therefore cheaper to manufacture and easier to handle, than would be the case for a rigid platform with the required strength to absorb parachute opening loads and landing loads without deformation. Once the loads are removed, the trusses return to their undeformed disposition and the modules 10a, 10b are returned to their co-planar disposition.

There are a number of variations that may be made to the platform described above with reference to the drawings. For example, the platform may be formed of more than two modules. Referring next to FIGS. 8 and 9, parts common to these Figures and to FIGS. 1 to 6 are given the same reference numerals and will not be described in detail. In this embodiment, the platform is formed of three modules 10a, 10b and 10c of the kind described above. The third module 10c is connected to the second module 10b by four hinges 18, as described above. The third module 10c has two struts 33, 34 that extend upwardly and inwardly from respective ends of the side edges 13a, 13b of the third module 10c to meet at an apex and a second horizontal strut 35 connects the apex to the apex of the struts 27, 28 of the second module 10b. The second riser 31 is connected to the apex of the struts 33, 34 of the third module 10c.

The three module platform is assembled and used in the same way as the two module platform, and has the same advantages, but is, of course, capable of carrying larger loads.

The structure above the platform need not be a truss structure as described above. It could be any suitable structure that deforms elastically to allow limited folding and opening movement between the modules. The hinges 18 do not have to be as described above: any suitable pivot arrangement between the modules may be provided that allows the folding and opening movement. The use of a lid 14 to mount the airbag 17 is optional. It may be omitted and the airbag 17 attached permanently to the module. The risers are optional the parachute(s) may be attached directly to the trusses or the platform.

The invention claimed is:

1. An aerial delivery platform comprising first and second modules each having a respective load-bearing surface, the first and second modules being connected together for relative folding and opening movement about an axis between the modules, and structural members connected to, and upstanding from, the first and second modules to hold the modules with the load bearing surfaces co-planar when loaded and during descent while being deformable elastically to permit limited relative folding and opening movement between the first and second modules on a parachute opening and on landing.

2. A platform according to claim 1, wherein said first and second modules when in a coplanar configuration have respective first and second edges joined along said axis, at least one hinge being provided between the first and second edges to allow said relative folding and opening movement.

3. A platform according to claim 2 wherein the first and second edges carry respective first and second hinge parts, the first and second hinge parts inter-engaging to provide said hinge.

4. A platform according to claim 3 wherein each of the first and second hinge parts is formed by a pair of spaced plates, a plate of one hinge part extending between the plates of the other hinge part and a pivot pin extending through said plates to provide a pivot axis.

5. A platform according to claim 2 wherein two or more hinges are provided at spaced positions along said first and second edges, said hinges having a common pivot axis.

6. A platform according to claim 2 wherein the first and second edges are straight edges.

7. A platform according to claim 1 wherein the structural members form an elastically deformable truss structure.

8. A platform according to claim 7 wherein two truss structures are provided, each extending along a respective side of the first and second modules.

9. A platform according to claim 8 wherein each truss structure is connected to the respective side of the first and second modules at least at ends of said side and at a hinge between the modules.

10. A platform according to claim 7 wherein the truss structure is formed by a framework of interconnected struts.

11. A platform according to claim 7 wherein the truss structure includes at least one suspension riser providing a connection between the platform and a parachute.

12. A platform according to claim 11 wherein the suspension riser is formed by a pair of elongate members extending away from the platform and meeting at an apex providing said connection between the platform and a parachute.

13. A platform according to claim 1 wherein each module includes an airbag mounted beneath the associated module, the airbag being deployable as the platform lands.

14. A platform according to claim 13 wherein each module has spaced side edges, the associated airbag, when deployed, extending laterally beyond said side edges.

15. A platform according to claim 13 wherein each module comprises an outer frame and a lid hinged to the frame for movement between a position in which the lid is closed into the frame to form a load bearing surface and an open position providing access through the frame for mounting the airbag to the module.

16. A platform according to claim 15 wherein at least one strut is provided between the frame and the lid for supporting the lid when the lid is in the open position.

17. A platform according to claim 13 wherein each module includes a base frame to which the airbag is detachably connected.

18. A platform according to claim 1 and including a quick-release fitting for connecting a load to, and allowing disconnection of a load from, the platform.

19. A platform according to claim 1 and including at least one further module and associated structural members.

20. An aerial delivery platform comprising first and second modules each having a respective load-bearing surface, the first and second modules being connected together for relative folding and opening movement about an axis between the modules, and structural members connected to, and upstanding from, the first and second modules to hold the modules with the load bearing surfaces co-planar when loaded and during descent while being deformable elastically to permit limited relative folding and opening movement between the first and second modules on a parachute opening and on landing, each module including an airbag mounted beneath the respective module, the airbag being deployable as the platform lands, and each module further including an outer frame and a lid that is movable between a position in which the lid is closed into the frame to form the respective load bearing surface and an open position providing access through the frame for mounting the airbag to the respective module.

21. The platform according to claim 20, wherein the lid is pivotally movable between the position in which the lid is closed and the open position.

22. The platform according to claim 20, wherein the lid is hinged to the frame.

* * * * *